(12) United States Patent
Mouri et al.

(10) Patent No.: US 11,226,043 B2
(45) Date of Patent: Jan. 18, 2022

(54) BALL VALVE

(71) Applicant: FUJIKIN INCORPORATED, Osaka (JP)

(72) Inventors: Tomohiro Mouri, Osaka (JP); Koji Hiramatsu, Osaka (JP); Tadayuki Yakushijin, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/944,802

(22) Filed: Jul. 31, 2020

(65) Prior Publication Data

US 2021/0033202 A1 Feb. 4, 2021

(30) Foreign Application Priority Data

Jul. 31, 2019 (JP) .............................. JP2019-141188

(51) Int. Cl.
*F16K 5/20* (2006.01)
*F16K 5/06* (2006.01)

(52) U.S. Cl.
CPC ............ *F16K 5/201* (2013.01); *F16K 5/0605* (2013.01); *F16K 5/0647* (2013.01)

(58) Field of Classification Search
CPC ....... F16K 5/201; F16K 5/0605; F16K 5/0647
USPC ....................................................... 251/164
See application file for complete search history.

(56) References Cited

U.S. PATENT DOCUMENTS

| | | | | |
|---|---|---|---|---|
| 4,834,340 | A | * 5/1989 | Girdley | ................... F16K 5/163 |
| | | | | 137/315.4 |
| 2001/0045231 | A1 | * 11/2001 | Monod | ............... F16K 11/0873 |
| | | | | 137/454.2 |
| 2013/0037738 | A1 | 2/2013 | Matsuoka et al. | |
| 2018/0149275 | A1 | * 5/2018 | Rizzio | ..................... F16K 51/00 |

FOREIGN PATENT DOCUMENTS

JP    2011-174598 A    9/2011

* cited by examiner

*Primary Examiner* — Kevin L Lee
(74) *Attorney, Agent, or Firm* — Locke Lord LLP

(57) ABSTRACT

A ball valve includes: a main body having a fluid inlet passage, a fluid outlet passage, and a column-shaped depression communicating with these passages and opening upward; a ball including a fluid communication passage and disposed at the column-shaped depression of the main body rotatably about a reference axis; an operating mechanism configured to cause the ball to rotate about the reference axis; a ball seat having a required opening on a peripheral wall thereof and disposed between the ball and the main body; a ball seat presser configured to press the ball seat; and a pressing screw configured to press the ball seat presser downward. The ball is rotated to achieve communication and cutoff. The ball seat has a substantially frustoconical shape having a bottom surface larger than a bottom of the depression in diameter, and an upper surface slightly smaller than the bottom surface in diameter.

8 Claims, 6 Drawing Sheets

BALL VALVE

BACKGROUND OF THE INVENTION

Field of the Invention

The present invention relates to a ball valve configured to achieve communication and cutoff by rotating a ball.

Description of Related Art

There is a well-known ball valve, in the related art, including: a main body having a fluid inlet passage, a fluid outlet passage, and a communication part provided between these passages; a ball including a fluid communication passage and being disposed at the communication part of the main body so as to be rotatable about a reference axis: and a ball seat having a substantially cylindrical shape provided with a required opening on a peripheral wall thereof and disposed between the ball and the main body, in which communication and cutoff between the fluid inlet passage and the fluid outlet passage are achieved by rotating the ball about the reference axis (JP-A-2011-174598).

In the valve described in JP-A-2011-174598, seal is effected by tightening a packing pressing screw and applying a sufficient load from a ball seat presser to the ball seat, so that leakage of a fluid from between the ball and the ball seat and between the ball seat and the main body is prevented. However, in a case where a large amount of fluid is flowed or where a fluid at high pressure is flowed, it is necessary to increase a force of tightening with the packing pressing screw and apply a larger load to the ball seat in order to effect seal. This may cause problems that a torque required for an opening and closing operation is increased and a retainer to be fitted into the ball seat is deformed.

The ball valve is assembled by fitting the ball into an internal space of the ball seat having an outline of a column shape and then press-fitting the ball seat into the main body. Reduction of the load applied to the ball seat due to the tightening of the packing pressing screw is expected by increasing a diameter of the ball seat. However, it may cause another problem that the ball seat cannot be press-fitted into the main body.

SUMMARY OF THE INVENTION

It is an object of the present invention to provide a ball valve configured to achieve communication and cutoff by rotating a ball, in which a ball seat with the ball fitted therein can easily be assembled to a main body and a load to be applied to the ball from a ball seat presser is small.

According to an aspect (1) of the invention, there is provided a ball valve including: a main body having a fluid inlet passage, a fluid outlet passage, and a column-shaped depression communicating with the fluid inlet passage and the fluid outlet passage and opening upward; a ball including a fluid communication passage and being disposed at the column-shaped depression of the main body so as to be rotatable about a reference axis, the ball being rotated about reference axis to achieve communication and cutoff between the fluid inlet passage and the fluid outlet passage: an operating mechanism configured to cause the ball to rotate about the reference axis; a ball seat provided with a required opening on a peripheral wall thereof and disposed between the ball and the main body; a ball seat presser provided above the ball seat and configured to press the ball seat; and a pressing screw configured to engage an inner periphery of the depression and press the ball seat presser downward, in which the ball seat has a substantially frustoconical shape having a bottom surface larger than a bottom of the depression in diameter, and an upper surface slightly smaller than the bottom surface in diameter.

An outline of the ball seat of the ball valve in the related art is a column shape, and a side surface of the ball seat is provided with an opening communicating with the fluid inlet passage and the fluid outlet passage, and the ball seat is provided with a spherical space for accommodating the ball in an interior thereof, and is provided with a hole on an axially upper side thereof for fitting a stem. A thickness of the ball seat in a vicinity of an axially center is thinner than other parts to allow easy resilient deformation.

The ball seat is formed of a synthetic resin material, and more specifically, preferably formed of PTFE (polytetrafluoroethylene), PFA (Tetrafluoroethylene-Perfluoroalkylvinylether Copolymer), PEEK (Poly Ether Ether Ketone), Ultra High Molecular Weight Polyethylene and the equivalent. In the case of the ball valve of the related art, a portion in the vicinity of the axially center of the ball seat having less thickness has a lower surface pressure, and thus the fluid is more likely to leak from the portion in the vicinity of the axially center of the ball seat.

In contrast, with the ball valve according to the aspect (1) of the invention, the ball seat has a substantially frustoconical shape having a bottom surface larger than a bottom of the depression of the main body in diameter, and an upper surface slightly smaller than the bottom surface in diameter. With this structure, the problem that the ball seat having the ball fitted therein cannot be fitted into the main body does not occur. In addition, it is estimated that the probability of leakage of the fluid from between the ball and the ball seat and between the ball seat and the main body is reduced because the resilient deformation of the portion of the ball seat in the vicinity of the axial center portion is reduced and decrease in surface pressure between the ball and the ball seat and between the ball seat and the main body is suppressed.

An aspect (2) of the invention provides the ball valve according to the aspect (1) of the invention further including a retainer internally fitted into the opening of the ball seat.

According to the aspect (2) of the invention, the retainer internally fitted into the opening of the ball seat is further provided. The retainer is preferably made of stainless steel in terms of corrosion resistance and strength. With the provision of the retainer, the probability of deformation of the ball seat is reduced, and an aperture serving as a fluid passage is secured.

In the ball valve of the related art, an excessive load needs to be applied from above to let the fluid at high pressure flow in order to prevent the leakage of the fluid between the ball seat and the ball and between the ball seat and the main body. Consequently, even the retainer may be deformed, which may lead to a risk of malfunctioning. In the case of the ball valve of the invention, since the necessity of application of the excessive load from above is avoided, the deformation of the retainer is avoided correspondingly.

An aspect (3) of the invention provides a ball valve according to the aspect (1) or (2) of the invention characterized in that a spring member is provided between the ball seat presser and the pressing screw.

According to the aspect (3) of the invention, since the spring member is provided, the load applied to the ball seat from above may be maintained by a repulsive force of the spring member against the load from above.

According to the ball valve of the invention, the ball seat having the ball fitted therein can easily assembled to the main body, and a positional distribution of a contact surface pressure between the ball seat and the ball and between the ball seat and the main body may be uniformized to prevent the leakage of the fluid from between the ball seat and the ball even though the fluid at high pressure is flowed.

DETAILED DESCRIPTION OF THE INVENTION

Embodiments of the invention will be described below with reference to the drawings. In the following description, expressions "upper and lower" correspond to "upper and lower" of the drawings. The expressions "upper and lower" are used for the sake of convenience, and the apparatus may be installed upside down or horizontally depending on circumstances.

Figure 1:
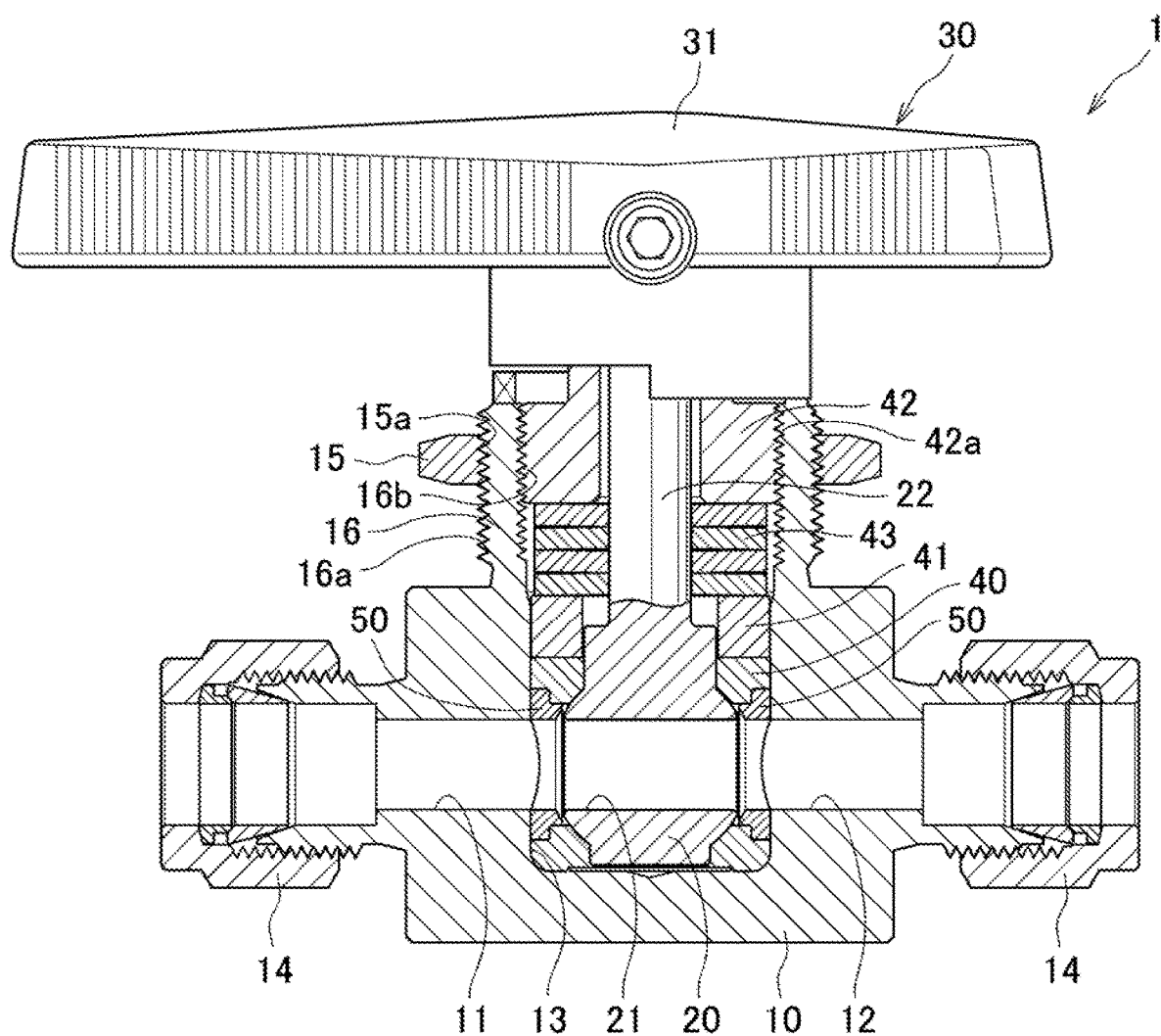
FIG. 1 illustrates an appearance view of a first example of a ball valve according to the invention.

FIG. 1 illustrates an example of a ball valve 1 of the invention. The ball valve 1 is provided with a main body 10. The main body includes a fluid inlet passage 11, a fluid outlet passage 12, and a depression 13 configured to communicate the fluid inlet passage 11 and the fluid outlet passage 12. The fluid inlet passage 11 and the fluid outlet passage 12 each are provided with a joint member 14.

The depression 13 receives therein a ball 20 configured to cut off and communicate a fluid, and the ball 20 is provided with a fluid communication passage 21 configured to serve as a fluid passage. A bottom surface of the depression 13 is subjected to surface roughening. A ball seat 40 formed of PTFE (polytetrafluoroethylene), which is a synthetic resin material, is disposed between the ball 20 and the main body 10. Leakage of the fluid is prevented by applying a compression load to the ball seat 40 from above.

A retainer 50 formed of a metal into a substantially ring shape is disposed at each of two openings which serve as inlet and outlet of the ball seat 40. The retainer 50 serves to prevent the ball seat 40 from being deformed and blocking the passage and is made of stainless steel. A stem 22 continuing from the ball 20 is formed above the ball 20, and an upper end portion of the stem 22 is coupled to a handle 31 of an operating mechanism 30. By rotating the handle 31, the ball 20 rotates and communication and cutoff of the fluid are achieved. However, the operating mechanism is not limited to those of a manual type, and other types that rotate with an electrical appliance or by air pressure is also applicable.

A cylindrical protrusion 16 protrudes upward from an upper part of the main body 10, and in an internal space of the protrusion 16 and the depression 13, a ring-shaped ball seat presser 41 that comes into contact with the ball seat, a disc spring 43, and a ball seat pressing screw 42 are arranged from the bottom.

A protrusion female thread 16b is formed on an inner surface of the protrusion 16 and engages a ball seat pressing screw male thread 42a formed on an outer surface of the ball seat pressing screw 42. The ball seat pressing screw 42 is rotated to apply a load from above and compress the disc spring 43, then a repulsive force of the disc spring 43 applies a load to the ball seat presser 41 from above, which is in turn transmitted to the ball seat 40, so that the ball seat 40 is compressed by the load applied from above.

A protrusion male thread 16a is formed on an outer surface of the protrusion 16 and engages a panel nut female screw 15a formed on an inner surface of a panel nut 15. A panel or the like can be sandwiched between the panel nut 15 and an upper surface of the main body 10.

Figure 2:
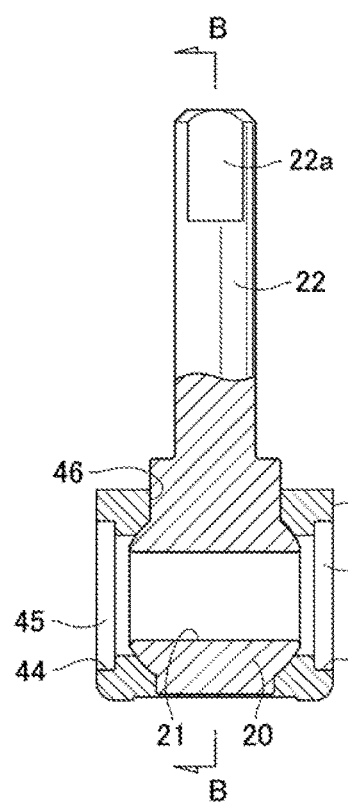
FIGS. 2A to 2C are enlarged views illustrating a ball seat, a ball, and a stem of the ball valve according to the invention.
Figure 2:
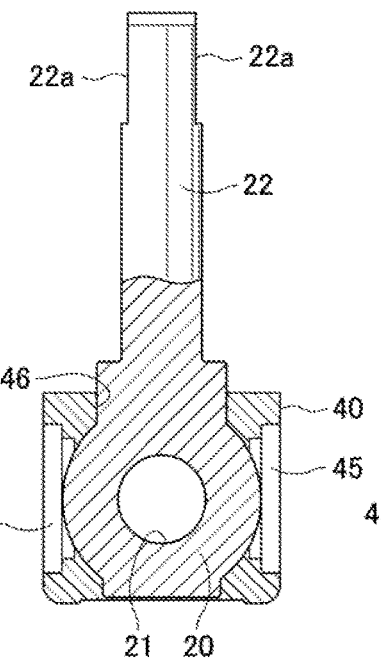
Figure 2:
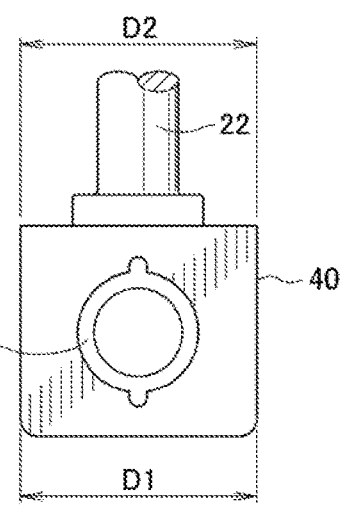

FIG. 2A to 2C illustrate the enlarged ball 20, the stem 22, and the ball seat 40. The ball seat 40 is provided with retainer accommodating spaces 45 for accommodating the retainers 50 at the openings 44 and is provided with an upper opening 46 formed in an upper portion thereof. A notch 22a is formed at an upper end portion of the stem 22, and the notch 22a engages the handle 31, so that the stem 22 and the ball 20 is rotated by the rotation of the handle 31, and the communication and cutoff of the fluid are achieved. FIG. 2A illustrates a state in which a fluid communicates, FIG. 2B illustrates a state in which the fluid is cut off, and FIG. 2C is a side view of the state illustrated in FIG. 2A.

In FIG. 2C, reference sign $D_1$ denotes a diameter of a bottom surface of the ball seat 40, and reference sign $D_2$ denotes a diameter of an upper surface of the ball seat 40. The diameter $D_2$ is slightly smaller than the diameter $D_1$ in the ball valve of the invention. The diameter $D_1$ is larger than the depression 13 of the main body 10, and the diameter $D_2$ is the same as a diameter of the depression 13 of the main body 10. Therefore, there is no gap present between a side surface of the ball seat 40 and an inner peripheral surface of the depression 13. In this example, an outer shape of the ball seat is a frustoconical shape. For example, however, a ball seat having a slight vertical rising part at a lower end portion and a frustoconical-shaped part formed upward therefrom is also applicable. In this sense, the shape of the ball seat is a substantially frustoconical shape.

Figure 3:
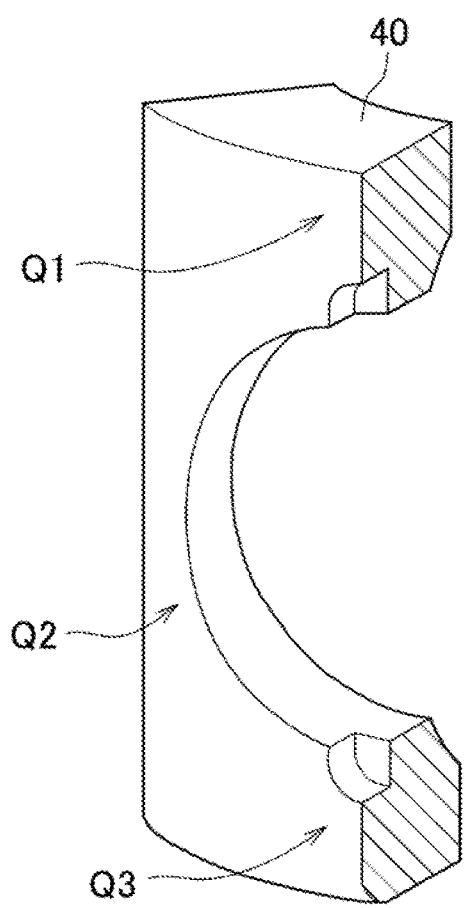
FIGS. 3A and 3B are partial perspective views of the ball seat used in the ball valve of the invention.
Figure 3:
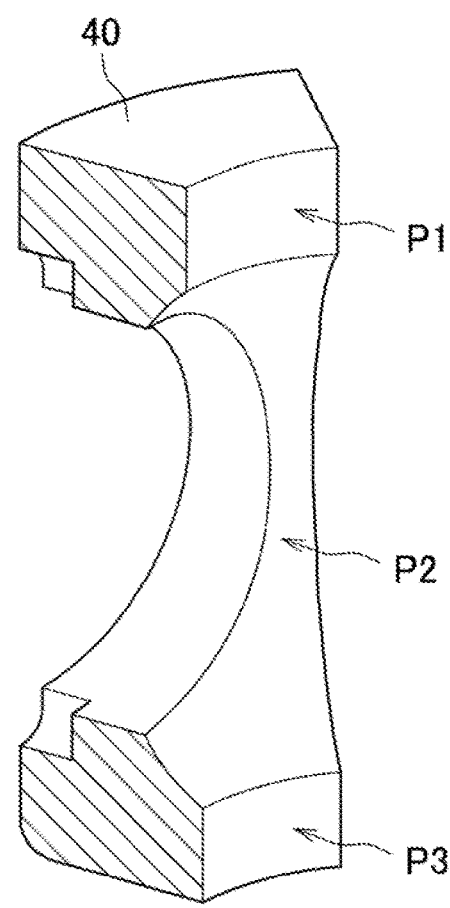

FIGS. 3A and 3B illustrate models for calculating a surface pressure distribution in a case where the load is applied to the ball seat from above. FIG. 3A illustrates an outer side of the ball seat, and FIG. 3B illustrates an inner side of the ball seat. Calculations were performed for three types of the ball seat, including a conventional type (the diameter of the upper surface: 27.0 mm, the diameter of the lower surface: 27.0 mm) and two new types (the diameter of the upper surface: 27.0 mm, the diameter of the lower surface: 27.2 mm) and (the diameter of the upper surface: 27.0 mm and the diameter of the lower surface: 27.5 mm). The results are shown in Table 1 and Table 2. These Tables 1 and 2 shows values of the surface pressure resulted from application of a load 9000 N from above to respective types of the ball seat. Respective rows correspond to positions $P_1$ to $P_3$ shown in FIGS. 3B and $Q_1$ to $Q_3$ shown in FIG. 3A.

TABLE 1

|  | Conventional type (φ27) | New Type (φ27-27.2) | New Type (φ27-27.5) |
|---|---|---|---|
| Upper position ($Q_1$) | 18.7 | 19.2 | 20.3 |
| Middle position ($Q_2$) | 12.5 | 20.6 | 21.1 |
| Lower position ($Q_3$) | 16.2 | 16.2 | 16.4 |

(Unit: MPa)

TABLE 2

|  | Conventional type (φ27) | New Type (φ27-27.2) | New Type (φ27-27.5) |
|---|---|---|---|
| Upper position ($P_1$) | 16.7 | 20.5 | 20.6 |
| Middle position ($P_2$) | 15.3 | 24.5 | 25.9 |
| Lower position ($P_3$) | 21.1 | 20.2 | 21.5 |

(Unit: MPa)

Figure 4:
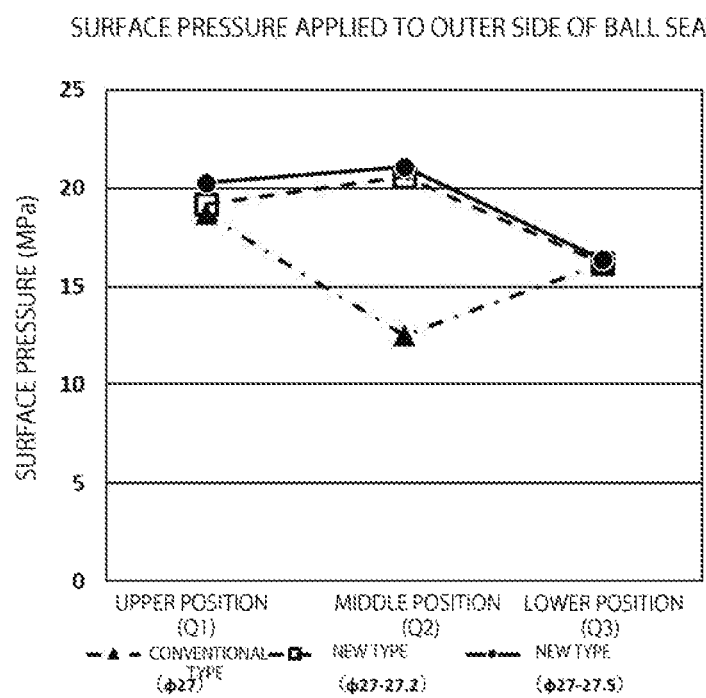
FIG. 4 illustrates surface pressures between the ball seat and the main body of a ball valve of the related art and the ball valve of the invention.

FIG. 4 is a graph showing the value in Table 1. In contrast to the surface pressure of 12.5 MPa at the middle position ($Q_2$) of the conventional type, the new type (φ27-27.2) has the surface pressure of 20.6 MPa, which is 8.1 MPa higher, and the new type (φ27-27.5) has the surface pressure of 21.1 MPa, which is 8.6 MPa higher.

Figure 5:
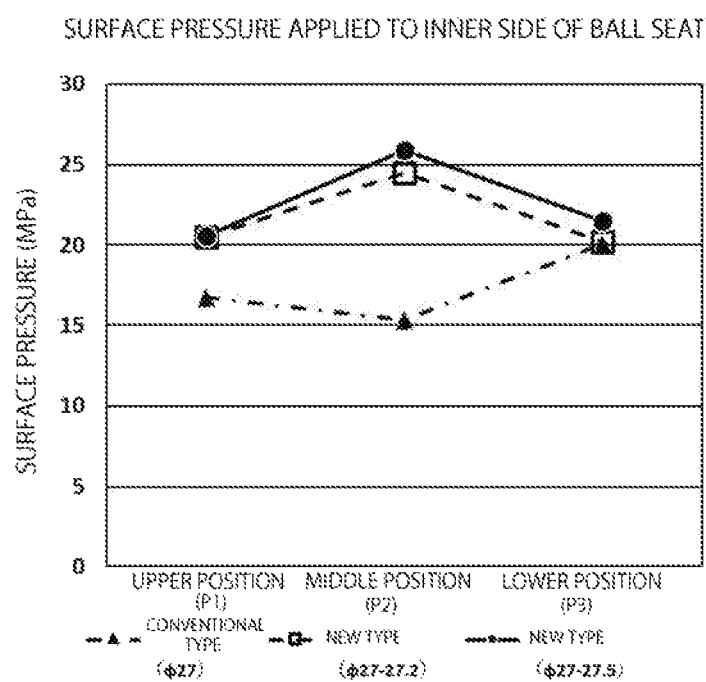
FIG. 5 illustrates surface pressures between the ball seat and the ball of the ball valve in the related art and the ball valve of the invention.

FIG. 5 is a graph showing the value in Table 2. In contrast to the surface pressure of 15.3 MPa at the middle position ($P_2$) of the conventional type, the new type (φ27-27.2) has the surface pressure of 24.5 MPa, which is 9.2 MPa higher, and the new type (φ27-27.5) has the surface pressure of 25.9 MPa, which is 10.6 MPa higher.

From FIG. 4 and FIG. 5, the fact that the surface pressure of the ball seat of the conventional type varies, whereas the surface pressures of the ball seat of the new types are subjected to less variation, so that portions having low surface pressure, which may cause leakage occurred in the conventional type, may be eliminated.

Figure 6:
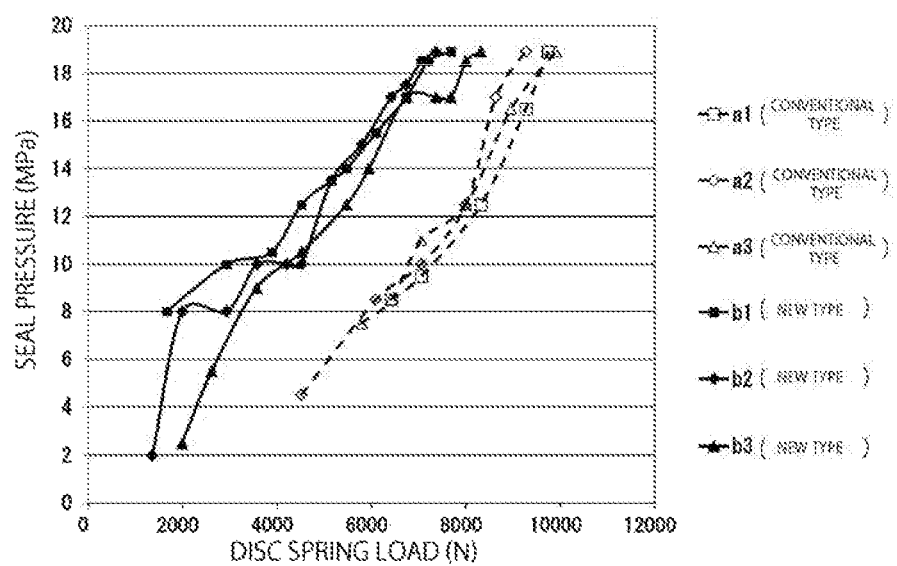
FIG. 6 illustrates a relationship between a disc spring load and a seal pressure of the ball valve in the related art and the ball valve of the invention.

FIG. 6 illustrates a relationship between the disc spring load (N) and the seal pressure (MPa). The seal pressure is a pressure at which leakage from the ball seat occurred when a pressure is applied in a state in which the interior of the ball valve 1 is sealed, and the disc spring load is a load applied from the disc spring 43 to the ball seat. The disc spring load was calculated from an amount of deflection and a spring constant of the disc spring 43.

Reference signs a1, a2, and a3 represent the ball seats 40 of the conventional type, and diameters of an upper surface and a lower surface thereof are both 27.0 mm, whereas reference signs b1, b2, and b3 represent the ball seats of the new type and diameters of the upper surface and the lower surface thereof are 27.0 mm and 27.5 mm, respectively. Three each of samples are prepared for the conventional type and the new type.

The disc spring load required for achieving the same seal pressure is smaller for the new type after improvement than for the conventional type. Therefore, the disc spring load for preventing leakage of the fluid can be reduced, and deformation of the components such as a retainer is avoided correspondingly. In order to achieve the seal pressure of 19 MPa, a load close to 10000 N is required for those of the conventional type, whereas only on the order of 8000 N is required for those of the new type after improvement.

The ball valve of the invention contributes to uniformization of positional distribution of the contact surface pressures between the ball seat and the ball and between the ball seat and the main body. Therefore, in comparison with the ball valve in the related art, leakage of the fluid from between the ball seat and the ball and between the ball seat and the main body is prevented even without increasing the load from above.

What is claimed is:

1. A ball valve comprising:
   a main body having a fluid inlet passage, a fluid outlet passage, and a column-shaped depression communicating with the fluid inlet passage and the fluid outlet passage and opening upward;
   a ball including a fluid communication passage and being disposed at the column-shaped depression of the main body so as to be rotatable about a reference axis, the ball being rotated about the reference axis to achieve communication and cutoff between the fluid inlet passage and the fluid outlet passage:
   an operating mechanism configured to cause the ball to rotate about the reference axis;
   a ball seat provided with a required opening on a peripheral wall thereof and disposed between the ball and the main body;
   a ball seat presser provided above the ball seat and configured to press the ball seat; and
   a pressing screw configured to engage an inner periphery of the depression and press the ball seat presser downward,
   wherein the ball seat has a frustoconical shape having a bottom surface larger than a bottom of the depression in diameter, and an upper surface smaller than the bottom surface in diameter.

2. The ball valve according to claim 1, further comprising a retainer internally fitted into the opening of the ball seat.

3. The ball valve according to claim 1, wherein a spring member is provided between the ball seat presser and the pressing screw.

4. The ball valve according to claim 1, wherein a bottom surface of the depression is subjected to surface roughening.

5. The ball valve according to claim 2, wherein a spring member is provided between the ball seat presser and the pressing screw.

6. The ball valve according to claim 2, wherein a bottom surface of the depression is subjected to surface roughening.

7. The ball valve according to claim 3, wherein a bottom surface of the depression is subjected to surface roughening.

8. The ball valve according to claim 5, wherein a bottom surface of the depression is subjected to surface roughening.

* * * * *